US006992661B2

(12) United States Patent
Ikehata

(10) Patent No.: US 6,992,661 B2
(45) Date of Patent: Jan. 31, 2006

(54) ELECTRONIC DEVICE, DIGITAL STILL CAMERA AND DISPLAY CONTROL METHOD

(75) Inventor: Tatsuhiko Ikehata, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 10/456,785

(22) Filed: Jun. 9, 2003

(65) Prior Publication Data

US 2004/0008210 A1 Jan. 15, 2004

(30) Foreign Application Priority Data

Jul. 10, 2002 (JP) ............................ 2002-200875

(51) Int. Cl.
*G09G 5/00* (2006.01)

(52) U.S. Cl. ...................................... 345/173; 345/671

(58) Field of Classification Search ................ 345/173, 345/174, 175, 176, 177, 178, 179, 180, 181, 345/182, 183, 671, 660

See application file for complete search history.

(56) References Cited

U.S. PATENT DOCUMENTS

| | | | | |
|---|---|---|---|---|
| 5,513,309 | A * | 4/1996 | Meier et al. | 345/179 |
| 5,615,384 | A * | 3/1997 | Allard et al. | 345/173 |
| 6,154,210 | A | 11/2000 | Anderson | |
| 6,687,614 | B2 * | 2/2004 | Ihara et al. | 345/173 |
| 6,731,826 | B1 * | 5/2004 | Yamamoto et al. | 382/305 |
| 2003/0107529 | A1 * | 6/2003 | Hayhurst et al. | 345/156 |
| 2004/0100479 | A1 * | 5/2004 | Nakano et al. | 345/700 |
| 2005/0024341 | A1 * | 2/2005 | Gillespie et al. | 345/173 |

FOREIGN PATENT DOCUMENTS

| | | |
|---|---|---|
| JP | 2000-341572 | 12/2000 |

* cited by examiner

*Primary Examiner*—Matthew Luu
(74) *Attorney, Agent, or Firm*—Finnegan, Henderson, Farabow, Garrett & Dunner, L.L.P.

(57) ABSTRACT

An electronic device comprises a touch screen configured to output coordinate information corresponding to the position where it is touched, a display unit configured to display an item indicating an operating area in a predetermined position on the touch screen, and a control unit configured to clear the item displayed on the display unit when an area of the touch screen other than the area indicated by the item is touched.

8 Claims, 3 Drawing Sheets

ELECTRONIC DEVICE, DIGITAL STILL CAMERA AND DISPLAY CONTROL METHOD

CROSS-REFERENCE TO RELATED APPLICATIONS

This application is based upon and claims the benefit of priority from the prior Japanese Patent Application No. 2002-200875, filed Jul. 10, 2002, the entire contents of which are incorporated herein by reference.

BACKGROUND OF THE INVENTION

1. Field of the Invention

The present invention relates to an electronic device using a touch-sensitive screen as an input unit, a digital still camera, and a display control method.

2. Description of the Related Art

With conventional digital still cameras, operations associated with flash setting, zooming photography, and reproduction of images (image-by-image forwarding, enlargement, reduction, etc.) are performed through the use of buttons provided on the back or top of the camera body.

Even if the demands increase for increasing the performance or functions of such digital still cameras and reducing their size, it is very difficult to meet such demands at the same time.

That is, to increase the performance or functions, it is required that more buttons be provided or the operation menu be nested deeply. In addition, to reduce the size, it is required to decrease the number of buttons and nest the operation menu more deeply.

However, increasing the buttons is against downsizing. Nesting the operation menu deeply results in poor operability.

At present, therefore, digital still cameras have been devised which use a touch screen as input means instead of increasing mechanical buttons. As the touch screen, use is commonly made of a pressure sensitive type which has a resistive film as disclosed in, for example, Japanese Unexamined Patent Publication No. 2000-341572.

The touch screen is constructed such that a transparent touch screen is placed on the surface of the liquid crystal display on the back of the digital still camera. By allowing the liquid crystal display unit to display a captured image and an operation menu, a function corresponding to an option touched by the user can be performed.

There will be two main methods for operating the touch screen. One method is to touch a command on the menu displayed on the liquid crystal display unit with a finger or pen, allowing a function corresponding to that command to be carried out.

When the user touches an arrow mark or the like displayed on the liquid crystal display while a still image is being reproduced, a function of forwarding to the next still image or making a return to the previous operation menu can be implemented. This method of operation is referred to as the so-called tapping operation.

The other operation method will be a tracing operation by which a finger or pen placed on the touch screen is moved left, right, up, or down. This operation allows characters to be entered or a display image to be moved at will. This operation method is referred to as the so-called dragging operation.

Thus, the methods for operating the touch screen include the tapping operation and the dragging operation. The touch screens placed on digital still cameras have their operating areas made very small, say, of the order of 1.5 inches.

When the dragging operation area and the tapping operation area are mixed, therefore, a misoperation is liable to occur in that the tapping operating area is touched when the dragging operation is performed.

Specifically, when the tapping operation area is formed in a corner of the display screen and the other area of the display screen is used as the dragging operation area, careless touching of the tapping operation area while the dragging operation is being performed would cause unintended commands to be entered through tapping operations.

For example, suppose that arrow marks for image-by-image forwarding and making a return to the preceding display mode are displayed on the tapping operation area and the dragging operation area is in a mode to reduce or enlarge an image. Then, it might be possible that, while an image is reduced or enlarged, image display is advanced unexpectedly to the next image or a return is made to the preceding display mode.

BRIEF SUMMARY OF THE INVENTION

According to an aspect of the present invention there is provided an electronic device comprising: a touch screen configured to output coordinate information corresponding to the position where it is touched; a display unit configured to display an item indicating an operating area in a predetermined position on the touch screen; and a control unit configured to clear the item displayed on the display unit when an area of the touch screen other than the area indicated by the item is touched.

According to another aspect of the present invention there is provided a digital still camera comprising: an imaging unit configured to convert an optical image of a subject into an electrical signal; a recording unit configured to record the electrical signal obtained from the imaging unit; a touch screen configured to output coordinate information corresponding to the position where it is touched; a display unit configured to display an image corresponding to the electrical signal from the imaging unit and an item indicating an operating area in a predetermined position on the touch screen; and a control unit configured to clear the item displayed on the display unit when an area of the touch screen other than the area indicated by the item is touched.

According to still another aspect of the present invention there is provided a display control method comprising: displaying an item indicating an operating area in a predetermined position on a touch screen configured to output coordinate information corresponding to the position where it is touched; and clearing the displayed item when an area of the touch screen other than the area indicated by the item is touched.

DETAILED DESCRIPTION OF THE INVENTION

Figure 1:
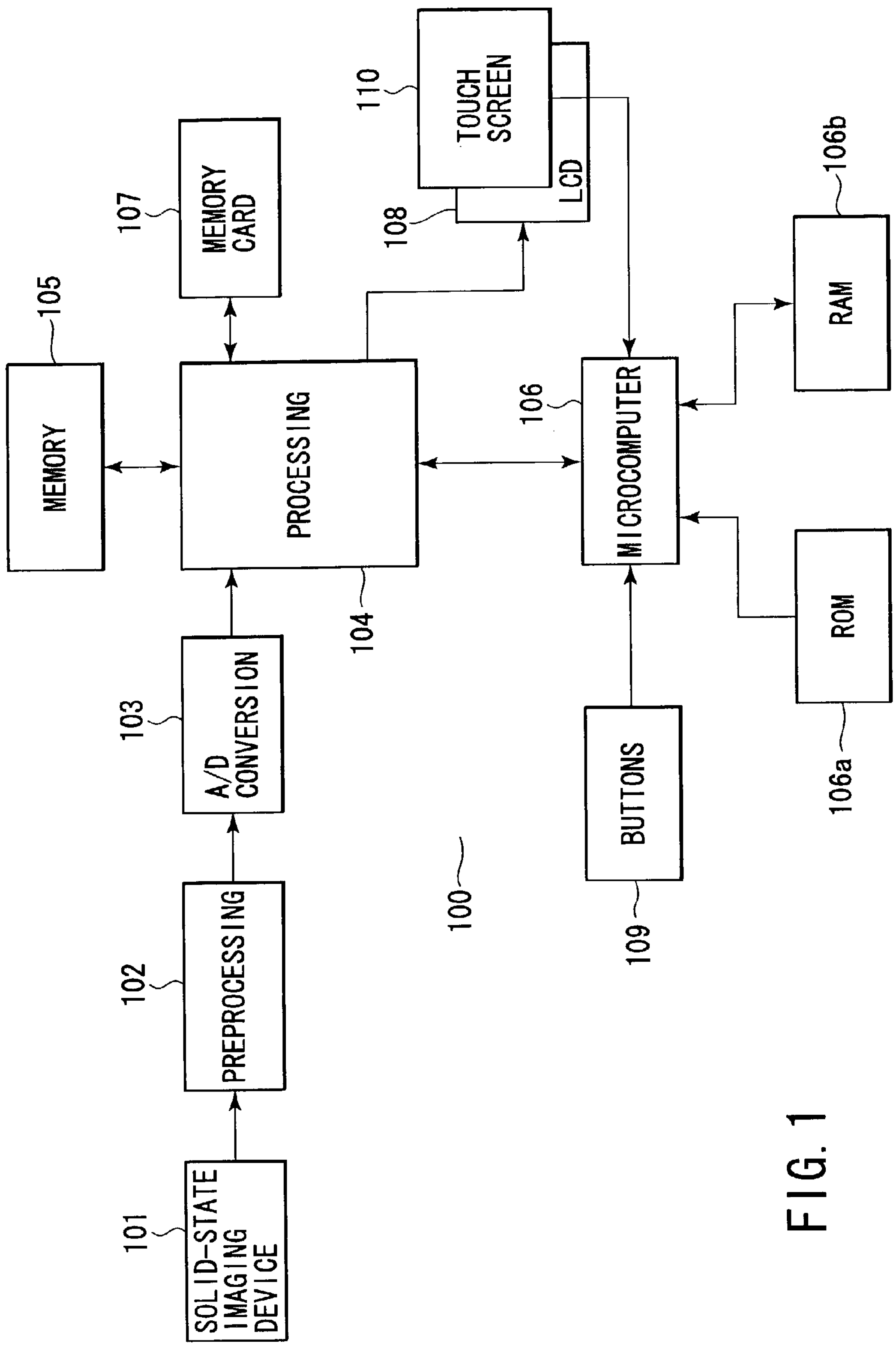
FIG. 1 is a block diagram of the signal processing system of a digital still camera according to an embodiment of the present invention.

An embodiment of the present invention will be described in detail below with reference to the accompanying drawings. FIG. 1 shows the signal processing system of a digital still camera 100 embodying the present invention.

An optical image of a subject is converted by a solid imaging device 101 into an electrical image signal. This electrical image signal is amplified and filtered in a preprocessing unit 102 and then converted into a digital signal by an analog-to-digital (A/D) converter 103. The resultant digital signal is subjected to signal processing in a processing unit 104 and then stored as image data in a memory 105.

A microcomputer 106 has a read only memory (ROM) 106*a* and a random access memory (RAM) 106*b* associated with it. The ROM stores control programs executed by the microcomputer and the RAM is used as a working area.

The microcomputer 106 controls the components of the camera in accordance with operating information entered through buttons 109 or a touch screen 110, i.e., as instructed by the user.

For example, the microcomputer 106 can write image data stored in the memory 105 into a memory card 107 or output it to a liquid crystal display (LCD) 108 of the order of, say, 1.5 inches for color display.

Also, the microcomputer 106 can output image data written into a memory card 107 to the liquid crystal display (LCD) 108 for color display.

Figure 2:
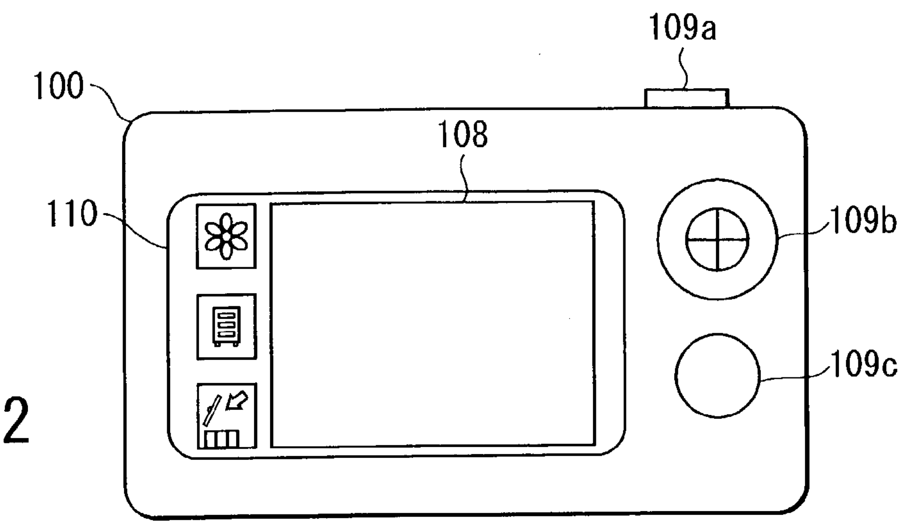
FIG. 2 shows a liquid crystal display unit and a touch screen placed on the back of the digital still camera of the embodiment of the present invention.

FIG. 2 shows the back of the digital still camera 100. On the back of the camera are placed the liquid crystal display 108, the touch screen 110, and keys 109*a*, 109*b* and 109*c* that form part of the buttons 109. The key 109*a* is a shutter key, the key 109*b* a cross key, and the key 109*c* a mode key 109*c*.

The touch screen 110 is placed on the liquid crystal display 108 so as to cover its entire display surface. The touch screen 110 is comprised of a resistive film-based touch sensor in the form of a transparent sheet.

In the touch screen 110, when its operating area is touched with a finger of the user, the resistive film sensor produces a change in voltage and the coordinate information indicating the position of the finger is sent to the microcomputer 106.

Specifically, the user touches with his or her finger a display item displayed on the liquid crystal display 108 and viewed through the transparent touch screen 110. Then, a command corresponding to that display item is entered into the microcomputer 106, so that the corresponding operation can be carried out.

The methods for operating the touch screen 110 include the following three methods:

(1) Tapping

Tapping refers to the user touching the touch screen with his or her finger and then releasing it from the touch screen. The digital still camera in this embodiment is designed not to recognize a tapping operation unless the user releases the finger from the touch screen.

Specifically, when the digital still camera is placed in the reproduction mode, the user taps a display item to forward to the next image or return to the preceding operation menu.

(2) Tapping and Holding

Tapping and holding refers to a state where the touch screen remains touched. In this case, a key entry is accepted even if the user does not release his or her finger from the touch screen. Specifically, this operation corresponds to an operation of counting up or down in date and time setting.

(3) Dragging

Dragging refers to an operation of moving the finger left, right, up, or down on the touch screen in the tapping and holding state. This corresponds to the so-called tracing operation. Specifically, this operation corresponds to a slide lever operation to control the display brightness or a display area moving operation when an image is enlarged.

Next, the operation of the digital still camera 100 will be described. As basic modes of operation the digital still camera 100 has a shooting mode and a reproduction mode.

In the shooting mode, operating the shutter key 109*a* allows image data output from the solid-state imaging device 101 and then subjected to signal processing to be recorded in the memory card 107.

In this case, various items corresponding to the shooting mode are displayed on the liquid crystal display 108. By the user touching desired displayed items through the touch screen 110, various operations needed in the shooting mode can be performed.

In the reproduction mode, on the other hand, recorded image data can be read from the memory card 107 and then displayed on the liquid crystal display 108.

In this case as well, various items corresponding to the reproduction mode are displayed on the liquid crystal display 108. By the user touching desired displayed items through the touch screen 110, various operations needed in the reproduction mode can be performed.

In the reproduction mode, various detail modes are prepared. Specifically, they are a normal display mode, an enlargement display mode, and a slide show mode. In the normal display mode, a reproduced image is displayed on the entire surface of the liquid crystal display 108; that is, the reproduced image can be viewed in its entirety.

In the enlargement display mode, a portion of a reproduced image is displayed with enlargement on the entire surface of the liquid crystal display 108. Moving the finger left, right, up, or down on the touch screen 110, i.e., performing a dragging operation, allows an image portion to be enlarged to be shifted at will.

In the slide show mode, recorded images are automatically displayed in sequence on the liquid crystal display 108. Specifically, each image data recorded in the memory card 107 is automatically read in sequence in a given order and displayed at regular intervals.

In each of the detail modes of the reproduction mode as well, various items are displayed. In a detail mode, touching a desired item through the touch screen 110 allows an operation command needed in that mode to be entered.

Figure 3:
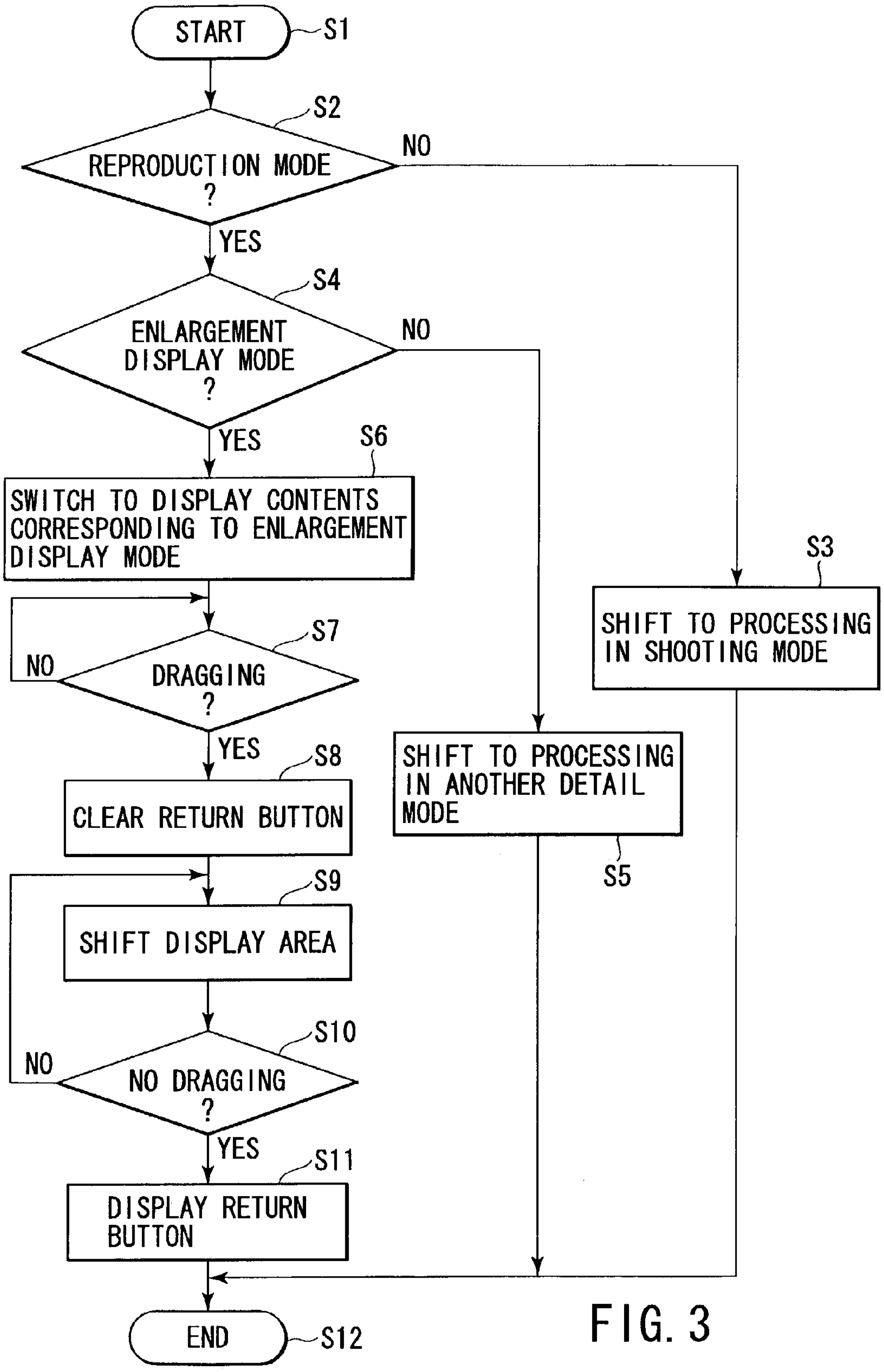
FIG. 3 is a flowchart illustrating the operation of the digital still camera of the embodiment of the present invention.

FIG. 3 is a flowchart illustrating the operation of the digital still camera 100, particularly the operation in the enlargement display mode. When the procedure is started in step S1, the microcomputer 106 makes a decision in step S2 of whether or not the current mode is the reproduction mode.

If the decision is that the current mode is not the reproduction mode (NO), then the microcomputer 106 decides that the current mode is the shooting mode. In this case, the procedure goes to processing in the shooting mode in step S3 and is then complete in step S12.

If YES in step S2, the microcomputer 106 makes a decision in step S4 of whether or not the current mode is the enlargement display mode.

If NO in step S4, the procedure goes to processing in another detail mode in step S5 and is then complete in step S12.

If YES in step S4 the procedures goes to step S6. In step S6, the microcomputer 106 switches the liquid crystal display 108 to display the contents corresponding to the enlargement display mode.

Figure 4:
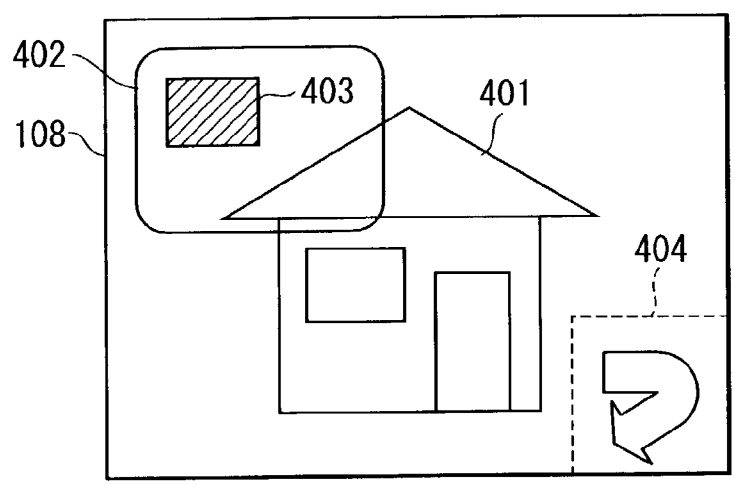
FIG. 4 shows an example of a display image of the liquid crystal display unit of the digital still camera of the embodiment of the present invention.

FIG. 4 shows exemplary contents displayed on the liquid crystal display 108 in the enlargement display mode. In this example, an image 401 of a house is displayed with enlargement on the liquid crystal display 108.

In the enlargement display mode, two frames 402 and 403 different in size are displayed in the upper left portion of the display surface of the liquid crystal display 108. The outer, larger frame 402 conceptually indicates the overall size of the image.

The inner, smaller frame 403 indicates that portion of the image which is being displayed with enlargement on the liquid crystal display 108. When an image portion to be enlargement displayed is shifted, the frame 403 moves within the frame 402 accordingly.

Each of the frames 402 and 403 is displayed as a semi-transparent image, thus allowing the enlarged image 401 to be seen through them.

Further, in the lower right portion of the display screen of the liquid crystal display 108 a return button 404 is displayed which allows switching from the enlargement display mode to the normal display mode. In a state where the return button 404 is displayed, when the user taps this area, a return is made from the enlargement display mode to the normal display mode.

Thereby, the display image on the liquid crystal display 108 is switched from the enlarged image to the original image. When switching to the normal display mode is made, the frames 402 and 403 displayed in the upper left portion of the display screen are erased.

Figure 5:
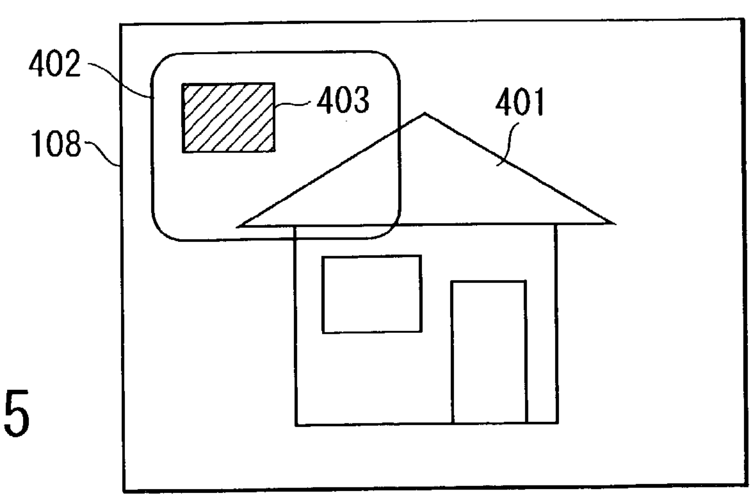
FIG. 5 shows another example of a display image of the liquid crystal display unit of the digital still camera of the embodiment of the present invention.

Next, the microcomputer 106 makes a decision in step S7 of whether or not a dragging operation has been performed on the touch screen 110. If the decision is that the dragging operation has been performed (YES), in step S8 the microcomputer 106 clears the return button 404 from the display screen as shown in FIG. 5.

Thus, it becomes possible to prevent an erroneous operation of touching the return button 404 by mistake during a dragging operation to switch unexpectedly from the enlargement display mode to the normal display mode.

When deciding in step S7 that a dragging operation has been performed, in step S9 the microcomputer 106 shifts an image portion to be displayed with enlargement in accordance with coordinate information sent from the touch screen 110 during the dragging operation. At this point, the microcomputer 106 also shifts the small frame 403 to the corresponding position.

To be specific, when the user drags upwards, the display area is shifted so that the upper portion of the whole image is displayed with enlargement. At the same time, the small frame 403 is also shifted upwards.

After that, in step S10 the microcomputer 106 makes a decision of whether or not a state in which the dragging operation is not performed has continued for more than a predetermined length of time, i.e., a state in which the coordinate information based on the dragging operation is not entered has continued for more than a predetermined length of time. If the decision is that the dragging operation has been performed before the predetermined length of time elapses (NO), then the procedure returns to step S9.

If YES in step S10, the microcomputer 106 displays, in step S11, the return button 404 on the display screen of the liquid crystal display 108 as shown in FIG. 4. The procedure is then complete (step S12).

Thus, the user becomes enabled to tap the return button 404 after the termination of the dragging operation. To return from the enlargement display mode to the normal display mode, therefore, the user simply taps the return button 404.

Thus, the embodiment is configured to automatically clear an item for tapping when a dragging operation is performed in a state where that item is displayed on the touch screen 110. Therefore, a misoperation of touching the item during the dragging operation can be prevented.

Although the embodiment has been described in terms of the enlargement display mode, there are other modes in which dragging and tapping operations are required, in which case as well a misoperation can be prevented by clearing an item for tapping during a dragging operation. Such other modes include:

(1) Reproduced Image Processing Mode

This is a mode in which the user performs a dragging operation on the touch screen 110 while an image is being displayed and draws the locus of dragging like painting, and the resulting drawing and the reproduced image are combined and recorded.

In such a case, a misoperation can be prevented during the dragging operation by clearing a tapping item during the dragging operation and displaying it again when the dragging operation is not performed for more than a predetermined length of time.

(2) Character Entry Mode

This is a mode in which the locus of dragging on the touch screen 110 is recognized as a character by the microcomputer 100 and the result of the recognition is entered as text data.

In this mode, a display item for tapping is required to determine and enter a recognized character. In this case as well, a misoperation can be prevented by clearing the tapping item during a dragging operation.

In the above description, a tapping item is cleared when a dragging operation is performed; however, this is not restrictive. For example, when an area other than an area where a tapping item is displayed on the touch screen 110 is touched, the tapping item may be automatically cleared.

According to the embodiment, in an electronic device equipped with a touch screen, misoperations can be reduced by not displaying a display item adapted for a tapping operation during a dragging operation on the touch screen.

That is, it becomes possible to reduce misoperations in which, when a first operation is being performed on a touch screen, a display item for a second operation is operated by mistake.

What is claimed is:

1. An electronic device comprising:

a touch screen configured to output coordinate information corresponding to the position where it is touched;

a display unit configured to display an image corresponding to input image data and display an item indicating an operating area in a predetermined position on the touch screen;

an enlargement display control unit configured to display, via the display unit, an enlarged image of a part of the image corresponding to the input image data, a first frame indicating an overall size of the image and through which the enlarged image is allowed to be seen, and a second frame indicating a position of the enlarged image relative to the image corresponding to the input image data within the first frame and through which the enlarged image is allowed to be seen, when placed in an image enlargement display mode; and an item display control unit configured to clear the item displayed on the display unit when an area of the touch screen other than the operating area indicated by the item is touched, when placed in the image enlargement display mode.

2. The electronic device according to claim 1, wherein the item display control unit causes the item to be displayed again on the display unit when the touch screen is not touched for more than a predetermined length of time in a state where the item is cleared.

3. A digital still camera comprising:

an imaging unit configured to convert an optical image of a subject into an electrical signal;

a recording unit configured to record the electrical signal obtained from the imaging unit;

a touch screen configured to output coordinate information corresponding to the position where it is touched;

a display unit configured to display an image corresponding to the electrical signal from the imaging unit and an item indicating an operating area in a predetermined position on the touch screen;

an enlargement display control unit configured to display, via the display unit, an enlarged image of a part of the image corresponding to the electrical signal obtained from the imaging unit, a first frame which indicates the overall size of the image corresponding to the electrical signal and through which the enlarged image is allowed to be seen, and a second frame which indicates a position of the enlarged image displayed relative to the image corresponding to the electrical signal within the first frame and through which the enlarged image is allowed to be seen, when placed in an image enlargement display mode; and an item display control unit configured to clear the item displayed on the display unit when an area of the touch screen other than the operating area indicated by the item is touched.

4. The digital still camera according to claim 3, wherein the item display control unit causes the item to be displayed again on the display unit when the touch screen is not touched for more than a predetermined length of time in a state where the item is cleared.

5. The electronic device according to claim 1, wherein the enlargement display control unit is configured to shift the position of the image displayed with enlargement by performing a dragging operation in the area of the touch screen other than the area indicated by the item and causing the second frame to shift the position to be displayed according to the dragging operation.

6. The electronic device according to claim 1, wherein the item indicates the operating area for switching from the enlargement display mode to a normal display mode, and the first frame and the second frame are erased when switching from the enlargement display mode to the normal display mode by touching the operating area on the touch screen indicated by the item in a state where the item is displayed.

7. The digital still camera according to claim 3, wherein the enlargement display control unit is configured to shift the position of the image displayed with enlargement by performing a dragging operation in the area of the touch screen other than the area indicated by the item and causing the second frame to shift the position to be displayed according to the dragging operation.

8. The digital still camera according to claim 3, wherein the item indicates the operating area for switching from the enlargement display mode to a normal display mode, and the first frame and the second frame are erased when switching from the enlargement display mode to the normal display mode by touching the operating area on the touch screen indicated by the item in a state where the item is displayed.

* * * * *